Aug. 27, 1957 L. P. WILCOX 2,804,591
ELECTRICAL TEST APPARATUS
Filed Dec. 11, 1953 2 Sheets-Sheet 1
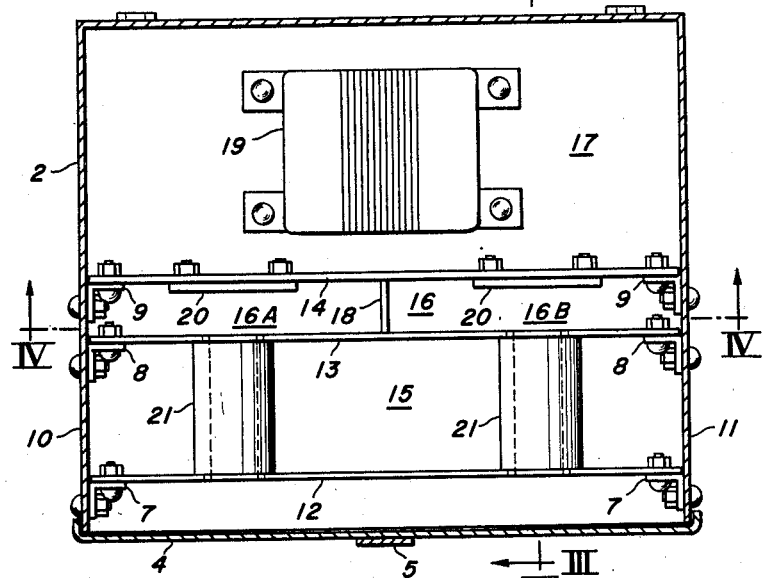
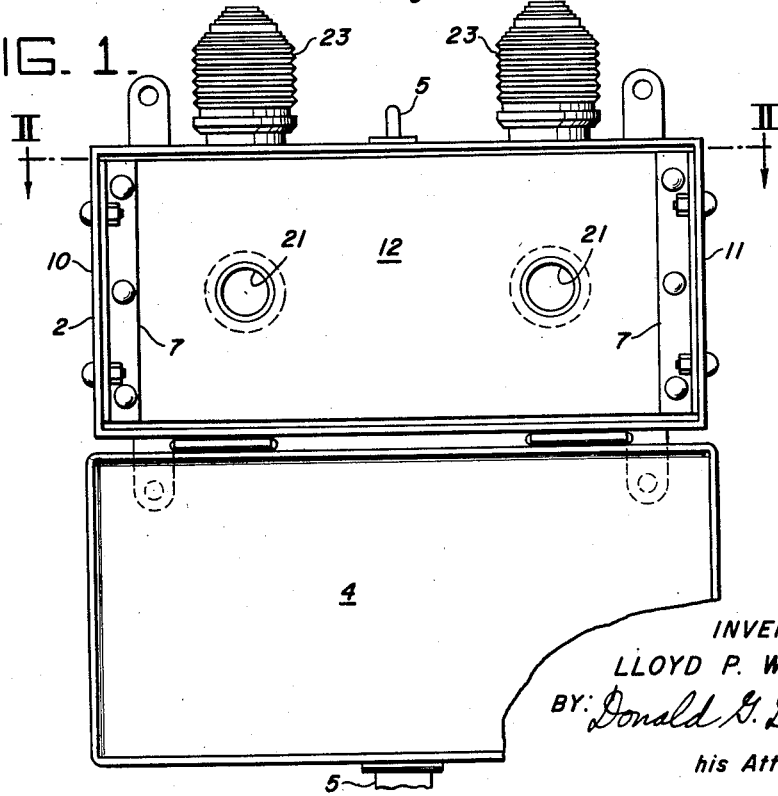
INVENTOR:
LLOYD P. WILCOX,
BY: *Donald G. Dalton*
his Attorney.

Aug. 27, 1957  L. P. WILCOX  2,804,591
ELECTRICAL TEST APPARATUS
Filed Dec. 11, 1953  2 Sheets-Sheet 2
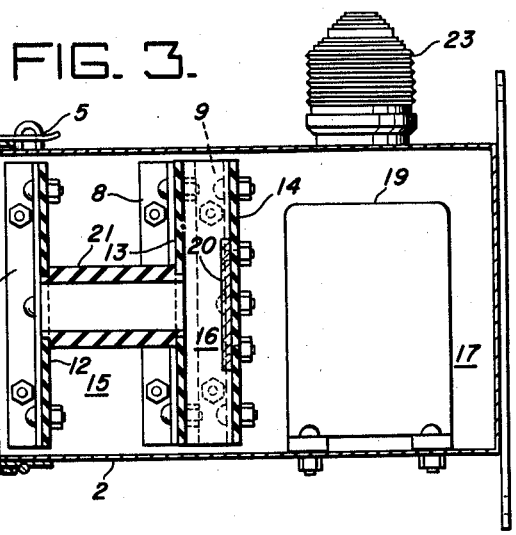
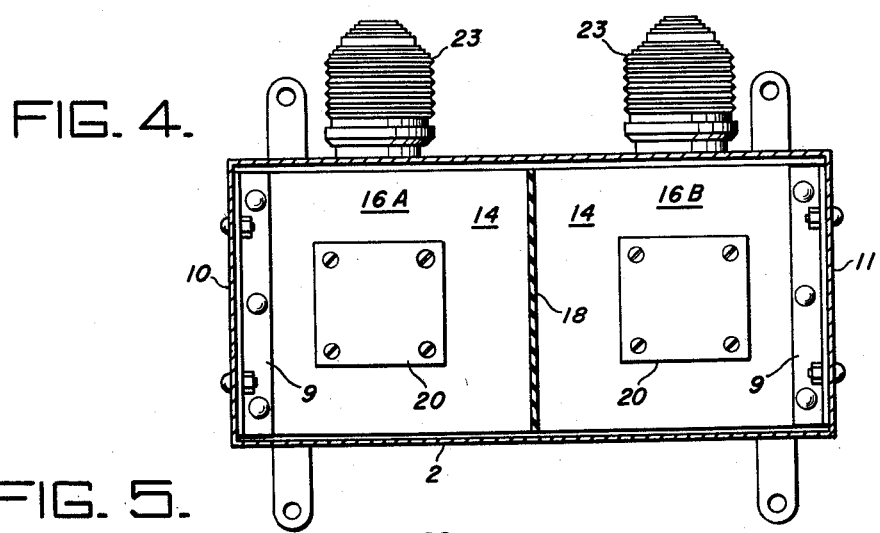
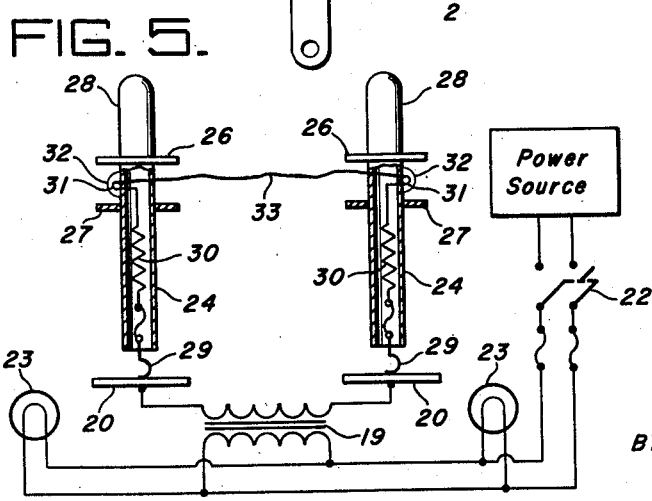
INVENTOR:
LLOYD P. WILCOX,
BY: Donald G. Dalton
his Attorney.

United States Patent Office 2,804,591
Patented Aug. 27, 1957

2,804,591

ELECTRICAL TEST APPARATUS

Lloyd P. Wilcox, Lorain, Ohio, assignor to United States Steel Corporation, a corporation of New Jersey Application December 11, 1953, Serial No. 397,577

2 Claims. (Cl. 324—51)

This invention relates to electrical test apparatus, and in particular to apparatus for the testing of "test sticks."

The test sticks, commonly used in substations, motor rooms and the like to determine whether high voltage circuits are dead or live, occasionally fail, due to deterioration of their current-limiting condensers and resistors. Such failure usually occasions a high intensity arc which may cause damage to the equipment and injury to the workman handling the sticks.

It is an object of the present invention to provide apparatus for testing the sticks immediately prior to each use.

This and other objects will be apparent from the following specification when read in conjunction with the attached drawings in which:

Figure 1 is a front elevation of the apparatus with cover open;

Figure 2 is a sectional view taken along the lines II—II of Figure 1;

Figure 3 is a sectional view taken along the lines III—III of Figure 2;

Figure 4 is a sectional view taken along the lines IV—IV of Figure 2; and

Figure 5 is a schematic wiring diagram of the apparatus of the present invention.

With particular reference to the drawings, the apparatus comprises a metal housing or cabinet 2 having a hinged cover 4 which may be secured in closed position by a hasp or similar device 5. Pairs of clip angles 7, 8 and 9 are secured to side walls 10 and 11 and serve to support panels 12, 13 and 14 which partition the cabinet into electrically separate compartments 15, 16 and 17, the foremost panel 12 serving as the front face of the cabinet. The middle compartment 16 is further subdivided into subcompartments 16A and 16B by a panel 18 which extends between the panels 13 and 14 at about the midpoint thereof. The panels 12, 13, 14 and 18 are of stiff material having high electrical insulation value such as Bakelite or Micarta. A potential transformer 19 capable of supplying a voltage equal to that of the circuit to be tested is mounted in rear compartment 17 and the high voltage secondary thereof is connected to a pair of copper contact plates 20, one located in each of the compartments 16A and 16B and mounted on the panel 14. The panels 12 and 13 are drilled to receive shouldered tubes or sleeves 21 also of Bakelite, Micarta or the like. These sleeves provide aligned passageways from the front of the cabinet to each of the contact plates 20. The arrangement is such that a pair of test sticks inserted through the sleeves 21 will be supported and maintained in contact with the contact plates 20. As indicated in Figure 5, the primary of transformer 19 is connected to a suitable low voltage power source through a fused disconnect switch 22. A pair of indicating lamps 23 are connected in parallel with the power source to indicate when the transformer is receiving power. These indicating lamps 23 are mounted on the top surface of the cabinet over compartment 17 as shown in the drawings.

While forming no part of the invention, test sticks are comprised of a pair of socketed rods 24 of a material possessing high dielectric strength. Each tube is provided with spaced collar portions 26 and 27 located toward the solid handle end 28. Mounted in the socketed portion of each rod is a carbon tetrachloride type fuse, one end of which is connected to a copper probe or contact member 29 which extends beyond the open end of the rod, the other end being connected in series with a suitable resistance 30; hence to a test lamp 31, the latter mounted in a housing 32 located between the collars 26 and 27. The test lamps of each stick are interconnected by a heavily insulated copper wire 33. The capacity of the resistor and fuse are so selected in the design of the sticks that the voltage across the lamps 31 is reduced to a low value, thus providing for the safety of the workman handling the sticks. The sticks are used by bringing the probes or contact members 29 into contact with opposite sides of the circuit to be tested. Provided the sticks are in good working order, lighting of the lamps 31 indicates a live circuit; while failure to light indicates the circuit dead and safe to be worked upon. If the sticks are defective, however, and the circuit being tested is live, the surge of current can cause failure and arcing. Safety to the workman handling the apparatus therefore depends upon the sticks being in top condition. Failure will also occur if the workman should apply sticks of too low capacity to a live circuit. Both these hazards can be readily and safely avoided by the test apparatus of my invention which is used in the following manner. With switch 22 open, i. e., with the primary of potential transformer 19 deenergized, the test sticks are inserted through sleeves 21 into contact with plate members 20, thus the secondary circuit of the transformer 19 is completed through the circuit of the sticks. Closing switch 22 energizes the transformer, which condition is indicated by the lighting of lamps 23 and applies a test voltage across the sticks equal to that of the circuit to be tested subsequently. If the sticks are in satisfactory working order the lamps in their handles will be lighted. Should, for any reason, the sticks be in defective condition or should the workman by mischance have chosen sticks of too low capacity, the resulting blowout or failure will occur without danger to the tester or any major item of equipment since the sticks are independently supported by the support sleeves 21 and any dangerous arcing will occur within the insulated compartments of the test cabinet.

While a transformer 19 having fixed secondary voltage is shown, where circuits of several voltage ratings are in use, and consequently test sticks of varying capacity must be tested, the apparatus can be supplied with a tapped secondary and a switching arrangement provided whereby one of the plates can be connected to a tap of the desired voltage.

While I have shown and described one specific embodiment of my invention, I do not wish to be limited exactly thereto except as defined in the scope of the appended claims.

I claim:

1. Apparatus for testing test sticks comprising a cabinet, a series of three parallelly disposed spaced partitions of high dielectric strength dividing said cabinet into electrically separate compartments, the foremost of said partitions forming a front face for the cabinet, a potential transformer mounted in the rearmost compartment, switch means for connecting the primary of said transformer to a suitable source of A. C. potential, a pair of metal contact plates having substantially flat contact surfaces electrically connected to the secondary of said transformer, said plates mounted at spaced-apart locations on the rearmost of the partitions with their contact surfaces disposed parallel to the surface thereof and in the next to the rearmost compartment, a pair of tubular members extending vertically with respect to the rearmost partition through the foremost and second partitions to terminate in the next to rearmost compartment and provide a pair of electrically separate passageways, one in alignment with each contact plate and adapted to guide and independently support a test stick into electrical contact therewith whereby an electric circuit between the secondary of the transformer and the test sticks can only be completed within the next to rearmost compartment of the cabinet and any arcing incident such completion is confined therein.

2. Apparatus as defined in claim 1 including a partition extending between the second and the rearmost parallel partitions and disposed to subdivide the compartment formed thereby into two electrically separate subcompartments each containing one of the contact plates.

References Cited in the file of this patent

UNITED STATES PATENTS

| | | |
|---|---|---|
| 2,478,414 | Michal | Aug. 9, 1949 |
| 2,605,322 | Edsall | July 29, 1952 |

FOREIGN PATENTS

| | | |
|---|---|---|
| 447,753 | Germany | Aug. 1, 1927 |
| 560,598 | Germany | Oct. 4, 1932 |
| 543,660 | Great Britain | Mar. 6, 1942 |
| 595,144 | Great Britain | Nov. 27, 1947 |